Patented Oct. 31, 1922.

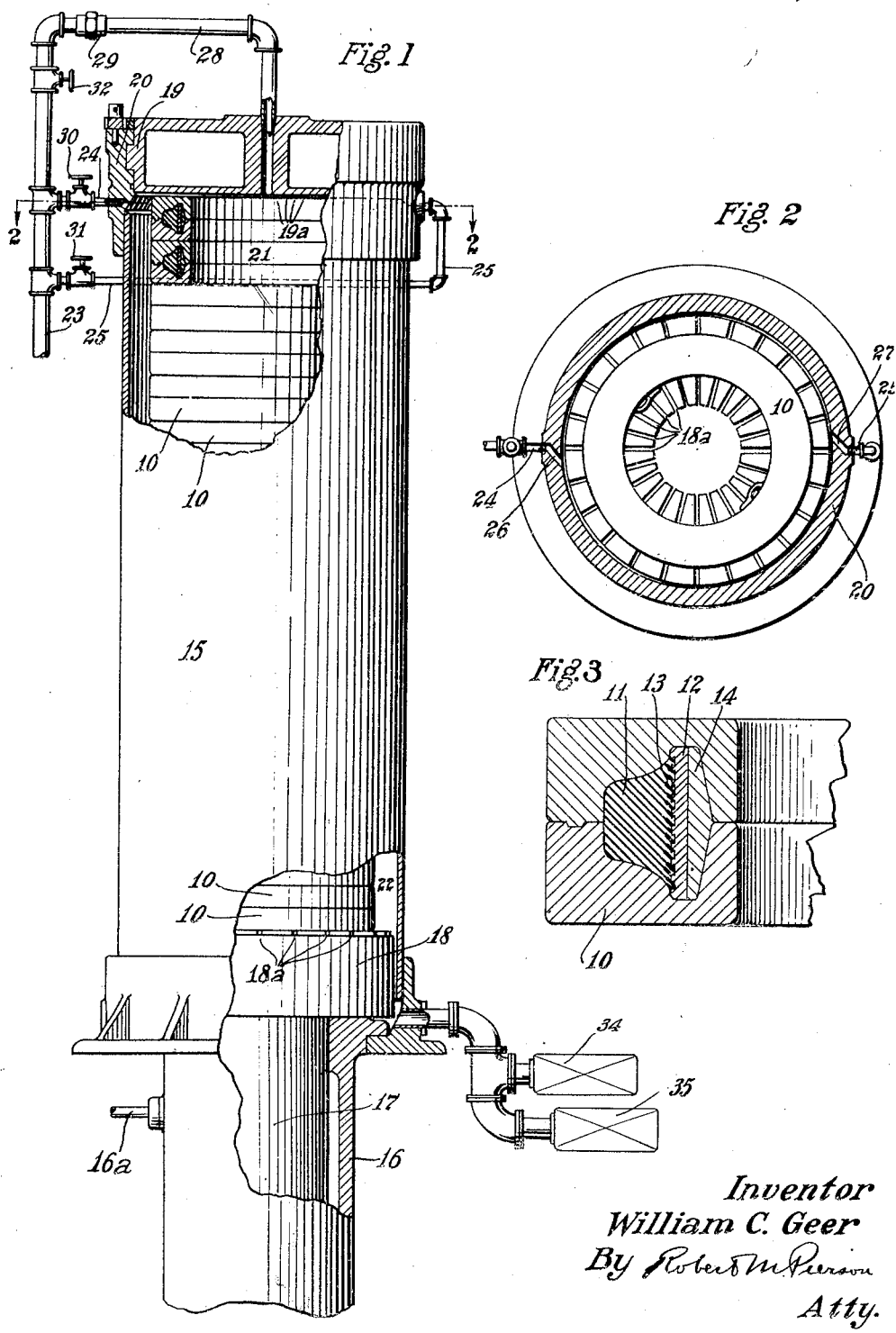

1,433,683

UNITED STATES PATENT OFFICE.

WILLIAM C. GEER, OF AKRON, OHIO, ASSIGNOR TO THE B. F. GOODRICH COMPANY, OF NEW YORK, N. Y., A CORPORATION OF NEW YORK.

METHOD AND APPARATUS FOR VULCANIZING TIRES.

Application filed August 31, 1921. Serial No. 497,080.

*To all whom it may concern:*

Be it known that I, WILLIAM C. GEER, a citizen of the United States, residing at Akron, in the county of Summit and State of Ohio, have invented a certain new and useful Method and Apparatus for Vulcanizing Tires, of which the following is a specification.

This invention relates to the art of vulcanizing tires and more particularly solid or cushion tires having a thick body of rubber composition fastened to a metal base by a layer of hard-rubber.

In methods and apparatus heretofore used, the heat has been applied to the tire principally from its outer periphery and an inferior product frequently has resulted from insufficient vulcanizing of the inner region of the tire and particularly the base portion, of hard-rubber compound, which should be subjected at least to as great, and preferably to a greater, amount of vulcanization than the soft-rubber compound composing the main body of the tire.

My object is to provide a method and apparatus whereby the hard-rubber compound composing that part of the tire lying next to the metal base conveniently may be subjected to an amount of vulcanization as great as or greater than that of the main body and tread portions of the tire, and an improved product thus obtained. A further object is to insure thorough vulcanization of the interior of the tire.

Of the accompanying drawings:

Fig. 1 is a side elevation of a vertical vulcanizing press embodying and adapted to carry out my invention, a part of the apparatus being shown diagrammatically, and a part being broken away to show a stack of tire molds within the press.

Fig. 2 is a section on the line 2—2 of Fig. 1.

Fig. 3 is an enlarged transverse sectional view of a solid tire and a mold enclosing the same.

Referring to the drawings, 10, 10 are two-part tire-molds of the usual construction, each enclosing, as shown clearly in Fig. 3, a solid tire 11 upon a metal base 12. 13 is the layer of the hard-rubber compound which is used to secure adhesion between the metal base 12 and the body of the tire 11. 14 is the usual wedging ring for holding the base 12 in exact position and preventing distortion thereof when the mold is closed.

For curing the tires I preferably use a vertical vulcanizing press 15, having a ram-cylinder 16, a water inlet and outlet pipe 16ª therefor and a vertically movable piston 17 carrying a lower platen 18, upon which latter the tire-containing molds 10 are stacked as shown in Fig. 1. 19 is a removable cover constituting an upper platen, detachably secured to a collar 20 at the top of the press. The lower platen 18 and the upper platen 19 are formed on their mold-contacting faces with radial grooves or flutes 18ª, 18ª and 19ª, 19ª, respectively, said grooves being adapted to afford restricted communication between the inner chamber 21 formed by the stack of molds 10 and the annular outer chamber 22 between the stack of molds 10 and the walls of the vulcanizer.

A steam supply pipe 23 is provided, having branches 24, 25 adapted to inject steam into the outer chamber 22, preferably near the top thereof, through inlet apertures 26, 27, respectively, (Fig. 2), the latter preferably being positioned diametrically opposite each other, and entering the chamber obliquely, as shown, in order to inject the steam tangentially. The steam supply pipe 23 is also provided with a branch pipe 28, connected thereto by a detachable coupling 29, and adapted to inject steam into the inner chamber 21 through the cover 19 of the vulcanizer, the coupling 29 being provided in order that the pipe 28 may readily be detached from the pipe 23 when said cover is removed. Suitable stop-valves 30, 31, 32 are provided for controlling the flow of steam through the steam-inlet-pipes 24, 25 and 28 respectively. At the bottom of the vulcanizer the usual exhaust pipe 33, with suitable air and water-venting traps 34, 35, is provided, said exhaust pipe leading directly from the outer chamber 22.

In the practice of my method with this apparatus the molds 10, containing the tires 11 upon the rims 12, are stacked upon the platen 18, as shown, the cover 19 is secured in place, and the platen 18 is raised as in the usual practice, to close the molds. The pipe 28 is then joined to the pipe 23 by the coupling 29, and by manipulation of the valves 30, 31, 32 steam is admitted to the inner chamber 21, the outer chamber 22, or both, at such rates as to produce a temperature gradient, of greater or less sharpness as may be desired, from the base region of the tire to its tread portion, the communication between the two chambers afforded by the radial grooves 18ª, 19ª in the platens 18 and 19 being so restricted as to permit the heating of one chamber somewhat more rapidly than the other, while the pressure is building up, although subsequently equalizing the steam pressure in the two chambers.

If a sharp temperature gradient is desired, with the higher temperature at the inner periphery of the tire, steam may be admitted only through the pipe 28, first heating the inner peripheries of the molds before sufficient steam can pass out through the radial grooves 18ª, 19ª to build up a substantial pressure in the outer chamber 22. There is an advantage, however, when the maximum temperature gradient is not desired, in admitting some steam, at a controlled rate, through the inlet pipes 24, 25, at the beginning of the operation, in that the tangential jets of steam from the inlet apertures 26, 27, by reason of the swirl set up thereby, crowd the air gradually downward with a minimum intermingling of the steam and air. The tangential entrance of the steam also avoids local overheating such as would occur if the jets impinged directly upon the molds. I do not, however, limit myself to a tangential steam inlet, nor is this feature claimed as a part of my invention.

With this apparatus, the rates of the flow of heat into the body of the tire from its inner and outer peripheries, respectively, may thus be controlled, and by initiating the vulcanization of the tire in the hard rubber layer and continuing the vulcanization of this portion while the soft-rubber cushion is being vulcanized, I obtain a more uniform cure of the rubber cushion or tire body, a better cure of the hard rubber layer, and a closer union between the soft-rubber tire-body, the layer of hard-rubber, and the metal base, than has been obtained by prior methods.

I claim:

1. The method of vulcanizing a tire which comprises initiating the vulcanization by increasing the temperature of the base portion of the tire more rapidly than that of its tread portion.

2. The method of vulcanizing tires which comprises assembling the tires in a stack to form a chamber and filling said chamber with a heating fluid at a different temperature from that of the medium immediately surrounding said chamber.

3. The method of vulcanizing tires which comprises assembling the tires in a stack to form a chamber, filling said chamber with a heating fluid first to heat the base portions of said tires, and permitting a restricted flow of said fluid from said chamber to the space surrounding said stack to heat the tread portions of said tires.

4. The method of vulcanizing tires which comprises placing the tires in molds, assembling said molds in a stack to form a chamber, and filling said chamber with a heating fluid at a different temperature from that of the medium immediately surrounding said chamber.

5. The method of vulcanizing tires which comprises enclosing the tires in molds, assembling said molds in a stack to form a chamber, filling said chamber with a heating fluid first to heat the base portions of said tires, and permitting a restricted flow of said fluid from said chamber to the space surrounding said stack to heat the tread portions of said tires.

6. The method of vulcanizing tires which comprises enclosing the tires in molds, assembling said molds in a stack to form a chamber, filling said chamber with a heating fluid first to heat the base portions of said tires, and permitting a restricted flow of said fluid from said chamber to the space surrounding said stack until the pressure of said fluid in said chamber and said space is equalized, to heat the tread portions of said tires.

7. The method of vulcanizing solid tires composed of a soft-rubber cushion secured to a metal base by an inner layer of hard-rubber compound which comprises initiating the vulcanization of the tire in said inner layer, and continuing the vulcanization thereof while vulcanizing the cushion.

8. The method of vulcanizing a solid tire composed of a soft-rubber cushion secured to a metal base by an inner layer of hard-rubber compound which comprises compacting the layer of hard-rubber against the base by molding pressure, partially vulcanizing the said layer onto the base, and then heating the cushion to a vulcanizing temperature.

9. The method of vulcanizing a tire composed of a soft-rubber cushion secured to a metal base by an inner layer of hard-rubber compound which comprises heating the hard-rubber layer to a vulcanizing temperature for a longer period than the cushion of soft-rubber composition.

10. Apparatus for vulcanizing a tire comprising an annular mold, and means for separately heating the base portions and tread portions of the mold walls to increase the temperatures thereof at different rates.

11. Apparatus for vulcanizing tires comprising a press adapted to support a plurality of annular tire molds in a hollow series forming a chamber, a set of tire molds so assembled, and means for supplying a heating fluid directly to the inside and outside of the chamber in proportional quantities to heat the base portions of the tires more rapidly than the tread portions thereof.

12. Apparatus for vulcanizing tires comprising a heater press, end platens therein adapted to abut the ends of a series of annular tire molds assembled substantially in axially aligned relation within said press, a set of tire molds so assembled and thus forming a chamber, fluid inlets opening respectively into said chamber and into the space within said heater press surrounding said series of molds, and means for separately controlling the flow of fluid through said inlets.

13. Apparatus for vulcanizing tires comprising a heater press, a ram therein, a cover for said press, a stack of tire molds between said ram and said cover, and means for introducing a heating fluid to the space surrounded by said stack through said cover.

14. Apparatus for vulcanizing tires comprising a heater press, an end platen therein having a fluid-conducting channel from the central region of its mold contacting face to its outer periphery, a series of annular tire molds assembled substantially in axially aligned relation against said platen, and means for injecting steam directly into the space surrounded by said series of molds.

In witness whereof I have hereunto set my hand this 26th day of August, 1921.

WILLIAM C. GEER.